Dec. 4, 1934.  E. W. ANGER  1,982,622
FLUID PRESSURE SYSTEM
Filed Jan. 2, 1932   2 Sheets-Sheet 1
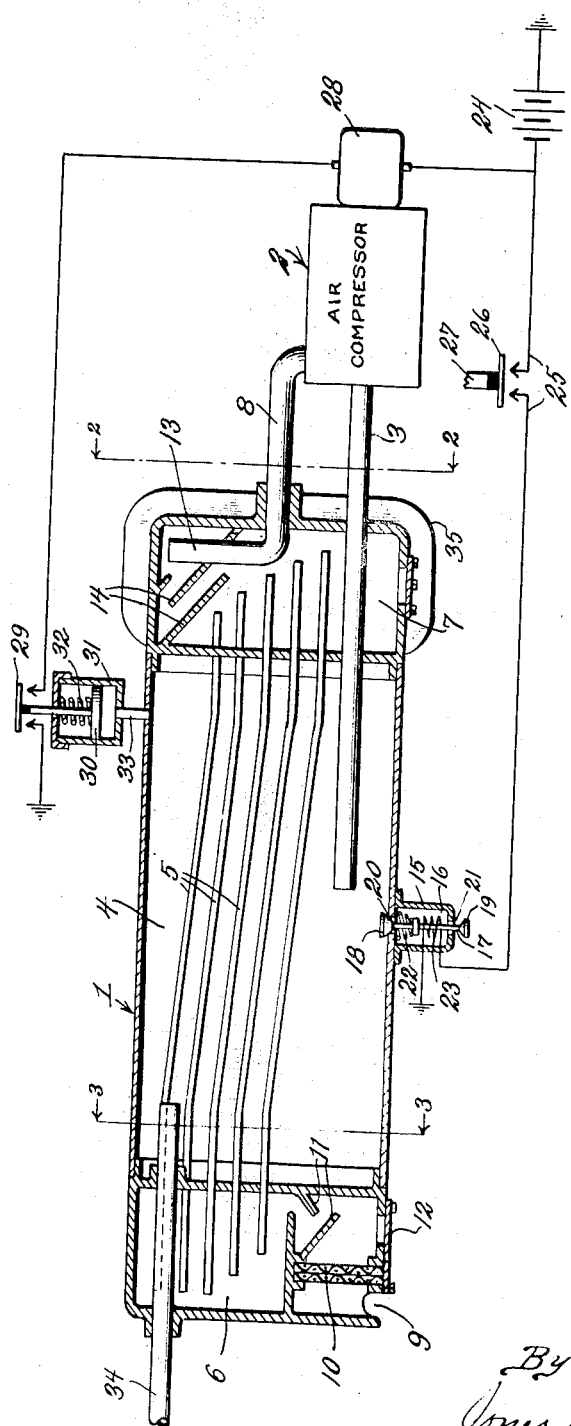
Inventor:
Edward W. Anger,
By
Jones, Addington, Ames + Seibold,
Attorneys.

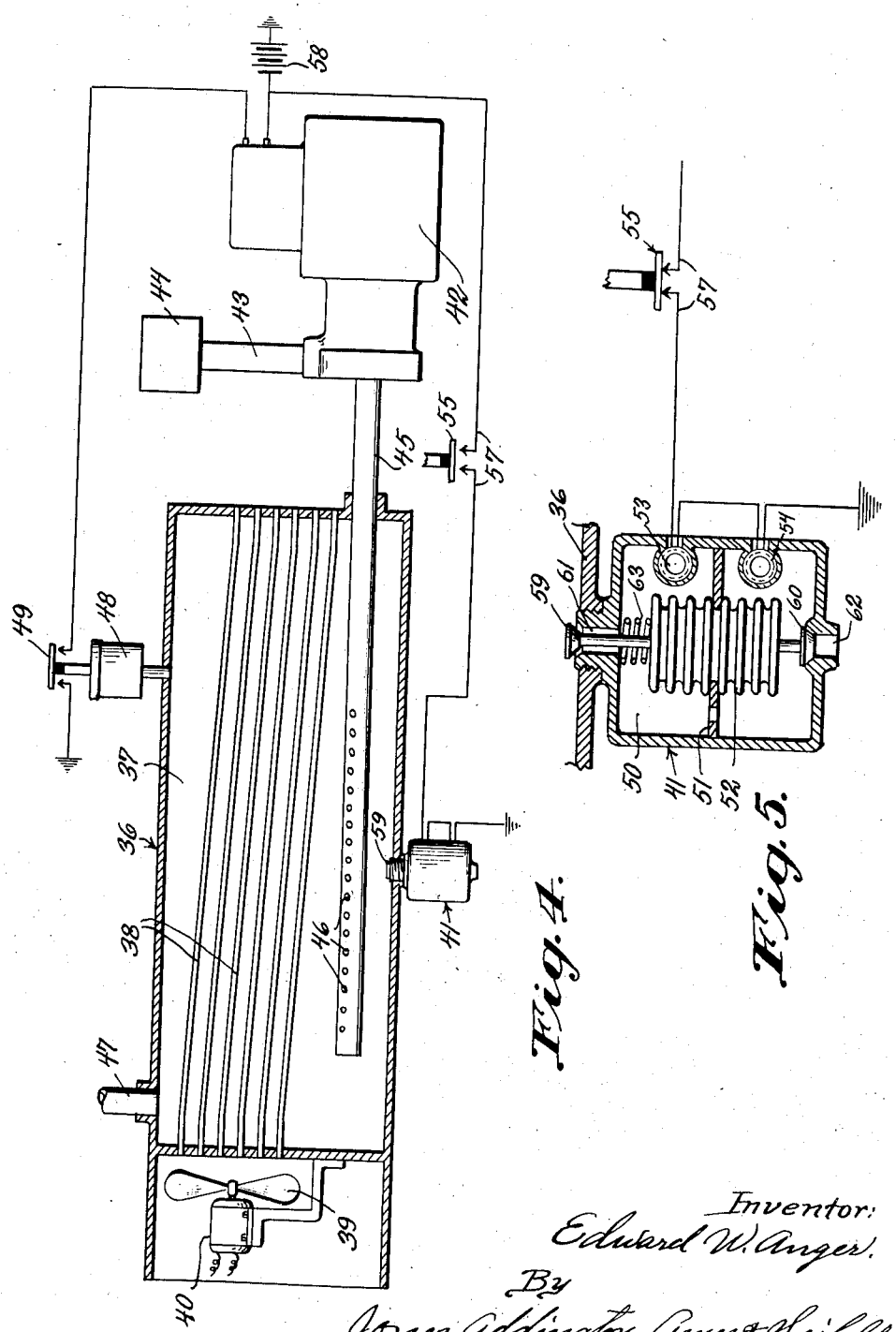

Patented Dec. 4, 1934

1,982,622

UNITED STATES PATENT OFFICE 1,982,622

FLUID PRESSURE SYSTEM

Edward W. Anger, Chicago, Ill.

Application January 2, 1932, Serial No. 584,417

12 Claims. (Cl. 62—140)

My invention relates to fluid pressure systems and more particularly to compressed air systems adapted for use in connection with the operation of brakes and wherein means is provided for condensing the moisture in the compressed air tank from which it may be intermittently removed thereby preventing the condensation and freezing of moisture in the system.

While the present invention is especially adapted for use with a compressed air-brake system of the type commonly employed in electric railway cars, it is to be understood that it may be applicable to other fluid pressure systems.

In fluid pressure systems, particularly of the type used for operating air-brakes, considerable trouble is experienced due to the freezing of condensed moisture within the system. It is desirable that any condensation of moisture should take place in the main compressed air tank, or so-called wet tank, where it may be frequently drained, otherwise it rapidly accumulates, decreasing the storage space in the air reservoir and interfering with the operation of the system as a whole. Furthermore, when the system is exposed to low temperatures, the condensation may freeze in any part thereof and impair the operation of the system.

A small amount of liquid in a compressed air tank ordinarily will not freeze as the compressed air usually gives off sufficient heat to prevent this. However, as the amount of condensation increases, the heat of the compressed air can no longer prevent it from freezing. It has, therefore, been found desirable to provide suitable automatically or manually operated means whereby liquids may be frequently drained from the system.

In compressed air systems, such as used for the control of air-brakes and similar installations, considerable lengths of so-called radiating pipes are used between the compressor and first main air reservoir; also between the first and second air reservoirs. This is intended to cause condensation which is supposed to drain into and be trapped in the reservoirs and intermittently drained therefrom. However, the moisture frequently freezes in these radiating pipes and renders the brake system useless.

In my invention I have overcome the above and other objections, and it has for an object the provision of suitable means for greatly increasing the normal rate of condensation of moisture in a compressed air system, and further, to provide for this increased condensation to take place at a location in the system adjacent the intake of compressed air, whereby the condensation may be easily trapped and removed and only substantially dry air be allowed to pass on into the conduits and operating parts of the system.

A further object is to provide efficient means whereby the air delivered to the inlet of the compressor may be used for the purpose of condensing moisture in the compressed air reservoir.

I also provide suitable means whereby air may be filtered, together with condensing means and intake cooling means, all of which may be incorporated in the structure of the compressed air reservoir.

In certain embodiments of my invention the air passing to the air compressor may be first passed through a filter and cleaning chamber, then used as a heat absorbing means for causing condensation in the compressed air, the incoming air may then be cooled and passed into the air compressor through which it is returned under pressure into the compressed air reservoir.

Further objects will be apparent from the specification and the appended claims.

In the drawings:

Figure 1 is a longitudinal vertical sectional view through the compressed air reservoir and drainage valve and control means therefor, the air compressor being shown diagrammatically in connection therewith;

Fig. 2 is an end view of the compressed air reservoir, the compressor intake and outlet pipes being shown in section on a line substantially corresponding to the line 2—2 of Fig. 1.

Fig. 3 is a transverse sectional view taken on a line corresponding to line 3—3 of Fig. 1; and Fig. 4 is a longitudinal vertical section similar to Fig. 1, but illustrating another embodiment of my invention.

Fig. 5 shows a temperature controlled drainage valve for the compressed air reservoir and control means therefor.

Referring to the drawings in detail, the embodiment illustrated in Fig. 1 comprises a compressed air reservoir 1 and an air compressor 2, the latter having an outlet pipe 3 communicating with a compressed air chamber 4 of the reservoir and which may form a part of any suitable air-brake system.

A plurality of comparatively small pipes 5 are mounted in the walls of the compressed air chamber and are arranged to allow the passage of air therethrough to the intake of the air compressor. A considerable number of comparatively small diameter pipes are ordinarily used in order to provide a comparatively large radiating surface. These pipes are preferably of a material having high heat conducting characteristics. The pipes 5 communicate at one end of the reservoir with an intake chamber 6 and at the opposite end with a chamber 7, with which latter chamber an intake pipe 8 leading to the air compressor is in communication. The pipes 5 are angularly disposed through the chamber 4 for the double purpose of compensating for expansion and contraction due to changes in temperature and to allow any moisture which condenses on the outer walls of the pipes to concentrate at a low point where it will drain to the bottom of the reservoir. The angular position also allows any moisture which might condense inside the pipes to drain into the chamber 7.

The chamber 6 is provided with an intake opening 9 and a removable screen 10 is supported in the chamber for the purpose of cleaning the air before it is passed to the compressor. This chamber is also provided with baffle plates 11 for the purpose of directing any dust or sediment to the bottom of the chamber where it may be removed by means of a removable plate 12.

In operation air is drawn by the compressor from the chamber 6 through the pipes 5 thereby greatly reducing the temperature of the walls of the pipes in the compressed air chamber 4 and causing condensation of moisture thereon. The air then passes into the cooling chamber 7 from which it is withdrawn to the compressor through the intake pipe 8. The intake pipe is provided with an upwardly extending portion 13 whereby the air is withdrawn from the top of the chamber 7. The pipe 8 may enter the chamber at the top if desired. This chamber is also provided with baffle plates 14 for the purpose of cooling the air which has absorbed considerable heat by being drawn through the pipes 5. By this means the heat conducting material of pipes 5 allows considerable heat to be absorbed from the compressed air chamber thereby tending to reduce the temperature of the compressed air as well as to cause the condensation of moisture. The air passing through the pipes 5 is thereafter cooled in the chamber 7 before entering the air compressor through the intake pipe 8.

In order to provide for the intermittent withdrawal of any condensation which may accumulate in the compressed air chamber 4, I provide an automatically controlled drainage valve 15. This valve may be of a construction similar to that disclosed and claimed in my co-pending application Serial No. 577,520, filed November 27, 1931, and is arranged to drain the condensation from the fluid pressure chamber of the reservoir with substantially no reduction of the pressure therein. In order to accomplish this, the valve may be provided with a chamber 16 in which is a vertically movable valve stem 17 having valve heads 18 and 19 thereon for the purpose of cooperating with valve seats 20 and 21, respectively. The outlet from the reservoir through the valve seat 20 is normally maintained closed by the downward pressure of a spring 22 on the valve stem 17.

When it is desired to drain the condensation from the reservoir, a solenoid 23, diagrammatically indicated, is energized, thereby raising the valve stem and causing the outlet from the reservoir to be opened and the outlet 21 from the valve chamber 16 to be closed. The condensation from the reservoir then flows into the valve chamber 16 and as soon as the solenoid 23 is de-energized, the spring 22 again closes the reservoir valve opening and opens the passage from the valve chamber 16, allowing the moisture to drain therefrom. The solenoid may be energized from any suitable power circuit or from a battery 24, which latter is shown connected therewith through the electric circuit 25. A switch 26 is provided in this circuit and is, in the present instance, connected with an arm 27 on any suitable movable portion of the brake operating system. It is obvious that by a control system of this type the condensed air reservoir may be drained intermittently whenever the brake is operated. It will also be understood that this operation may be performed either when the brakes are applied or when they are released, depending upon the adjustment of the switch 26, or, if desired, either the switch or valve may be manually controlled or operated.

The air compressor 2 is operated by means of a suitable motor 28 which is connected in series with the usual pressure controlled switch 29 mounted on a piston 30 in a cylinder 31. The piston is provided with a compression spring 32 normally tending to close the switch 28 and the cylinder is in communication through a pipe 33 with the compressed air reservoir whereby the switch 29 will be closed to operate the air compressor motor when the pressure in the reservoir is reduced below a certain predetermined amount. A pipe 34 is arranged to connect the reservoir with any desired compressed air system.

The casing of the cooling chamber 7 is provided with a plurality of cooling vanes 35 which assist in radiating the heat from the incoming air.

As shown in Fig. 3, the small condensing pipes 5 are distributed throughout the upper portion of the chamber 4. The hot compressed air enters the low part of the chamber from the compressor discharge pipe 3 and flows against the condensing pipes 5, thereby causing substantially all of the condensation to take place before the air from the tank enters the outlet pipe 34 to other parts of the compressed air system.

The embodiment illustrated in Fig. 4 is somewhat similar to that previously described and comprises a compression tank 36 having a compression chamber 37 therein.

A plurality of comparatively small diameter pipes 38, which are similar to the pipes 5 previously described, are mounted in the end walls of the compressed air chamber with their ends open to the atmosphere.

Preferably, a fan 39 is mounted adjacent one end of the pipes and may be operated by a suitable power means, such as a motor 40 for forcing air through the pipes 38, thereby cooling the walls of the pipes and causing condensation of moisture in the compressed air chamber 37.

In the embodiment illustrated the reservoir is provided with a temperature-controlled valve 41 by which the condensed moisture may be drained therefrom. It will, of course, be understood that an automatically-controlled valve, such as previously described, may be used if desired, or, when automatic-valve control is not desired, any suitable manually-operable valve may be substituted. A compressor 42 is provided with an intake pipe 43 whereby air at atmospheric temperature may be drawn through a suitable cleaning chamber 44.

An outlet pipe 45 from the compressor communicates with the interior of the reservoir and in the present instance is provided with a plurality of openings 46 distributed along its length for the purpose of distributing incoming compressed air over the condensing pipes 38. These condensing pipes are also angularly disposed in the compressed air chamber to provide for expansion and contraction, and also to allow the moisture to easily drain therefrom. The circulation of air through these pipes by a suitable means, such as the movement of the tank through the air or preferably by the fan 39 or equivalent instrumentality, provides an efficient cooling means for condensing the moisture in the tank and on the outside of the pipes and thereby supplying dry compressed air through the outlet pipe 47 to other parts of the system.

The compressor 42 is also provided with a motor connected to a suitable power circuit, which latter is preferably controlled by means of a pressure controlled valve 48 arranged to intermittently operate a switch 49 in the power circuit.

The valve 41 is provided with a chamber 50 having a shelf 51 therein, which latter is arranged to support a temperature controlled expansible element 52, preferably of the ordinary metal bellows type. Electrical heating elements 53 and 54 are mounted in the chamber 50 and are, in the present instance, connected in series with each other and with a switch 55, which may be controlled either manually or automatically in the same manner as the switch 26 previously described.

The electric circuit 57 may be energized from any suitable source, such as the battery 58.

Valve members 59 and 60 are secured to opposite ends of the bellows for controlling the outlets 61 and 62 of the tank 36 and the valve 41, respectively.

The temperature controlled bellows 52 is supported intermediate its ends so that the valve 59 is normally closed and valve 62 is normally open. When the switch 55 is closed to energize the heating elements, as shown in Fig. 5, the bellows will expand, thereby closing valve member 60 and opening valve member 59 to allow condensed moisture to flow from the tank 36 into the valve chamber. When the switch 55 is opened, the element 52 will contract and the valve member 59 will close and valve member 60 will again open, allowing the fluid to drain from the valve chamber.

A spring 63 is arranged to delay the opening and accelerate the closing of the valve member 59 whereby the tank outlet 61 will be open only when the valve outlet 62 is closed, thereby allowing the condensed moisture to be removed without substantially reducing the air pressure.

It is obvious that modifications in the embodiment may be made without departing from the spirit of the invention and I, therefore, desire to be limited only by the prior art and the scope of the appended claims.

Having thus described my invention, what I claim and desire to secure by Letters Patent is:

1. In a compressed air system, the combination with a compressed air reservoir and a compressor, of means extending through said reservoir providing a comparatively large heat conducting surface, said means arranged to allow the passage of air therethrough for condensing moisture on said surface and to direct air to the intake of said compressor, and means for intermittently draining the moisture from said reservoir.

2. In an air brake system, the combination with a compressed air reservoir, of means for condensing moisture in said reservoir, and means dependent upon the operation of the brakes for intermittently draining the condensation from said reservoir.

3. In a compressed air system, the combination with a compressed air reservoir having an inlet and an outlet, a compressor for delivering compressed air through said inlet, a plurality of condensing conduits extending through said reservoir for the passage of air therethrough and positioned between said inlet and said outlet for causing condensation of moisture in said reservoir, said conduits being arranged to cause the moisture to drain thereon to a point remote from said outlet, said reservoir inlet being arranged to deliver compressed air below said conduits.

4. An air pressure system comprising a reservoir having a compressed air chamber, an air cleaning chamber and an air cooling chamber therein, a plurality of air conducting conduits extending through said compressed air chamber and communicating with said cleaning chamber and said cooling chamber, said conduits being arranged in said compressed air chamber between said inlet and said outlet for condensing moisture in said compressed air chamber, means for intermittently removing the moisture from said compressed air chamber, and means for withdrawing air from said cooling chamber.

5. In a compressed air system, the combination with a compressed air reservoir, of a compressor communicating therewith, and means for directing air at a comparatively low temperature and at substantially atmospheric pressure through the compressed air reservoir to the intake of the compressor and through the outlet of the compressor into the compressed air reservoir.

6. In a compressed air system, the combination with a compressed air reservoir, of a compressor communicating therewith, means for directing air to be compressed at a comparatively low temperature through the compressed air reservoir to the intake of the compressor, and means for cooling the air between the compressed air reservoir and the intake of the compressor.

7. An air pressure system comprising a compressed air reservoir and an air inlet chamber adjacent one end thereof, an air cooling chamber adjacent the opposite end, said compressed air chamber having passages therethrough and communicating with the inlet chamber and the cooling chamber, and an air compressor, the intake of said air compressor communicating with said cooling chamber and the outlet of said air compressor communicating with said compressed air chamber.

8. The method of condensing moisture in a volume of compressed air comprising passing comparatively small streams of air to be compressed through the volume of air which is compressed and in a relation to conduct heat therefrom.

9. In a compressed air system, the combination with a compressed air reservoir, of a compressor for delivering compressed air to said reservoir, an inlet for said compressor, a plurality of conduits extending through said reservoir, and means for connecting said inlet and said conduits in communicating relation whereby the air is first utilized as a cooling medium, before being compressed, by being passed through said conduits to condense the moisture in said reservoir.

10. In a compressed air system, the combination with a compressed air reservoir, chambers at each end of said reservoir, conduits extending through said reservoir and communicating with said chambers, a compressor, an inlet for said compressor leading to one of said chambers, and an outlet for said compressor leading to said reservoir, said compressor drawing air to be compressed through said conduits to cool the same whereby to condense moisture in said reservoir.

11. In a compressed air system, the combination with a compressed air reservoir having an inlet and an outlet, a compressor for delivering compressed air through said inlet, an air cleaning chamber at the forward end of said reservoir, an air cooling chamber at the opposite end of said reservoir, a plurality of conduits extending through said reservoir and communicating with said chambers whereby air will flow therethrough from said cleaning chamber to said cooling chamber to condense moisture in said reservoir, and means for supplying the air passing through said conduits into said cooling chamber to the inlet of said compressor.

12. In an air brake system, the combination with a compressed air reservoir, of an air compressor arranged to compress air therein, an air intake for said compressor and arranged to cause the incoming air to absorb heat from the air in said reservoir, and means in said intake to cause the dissipation of said absorbed heat before the air enters the compressor.

EDWARD W. ANGER.